Oct. 15, 1940.   W. C. ANDERSON   2,218,016
BUS BAR CLAMP
Filed Aug. 10, 1938   2 Sheets-Sheet 1
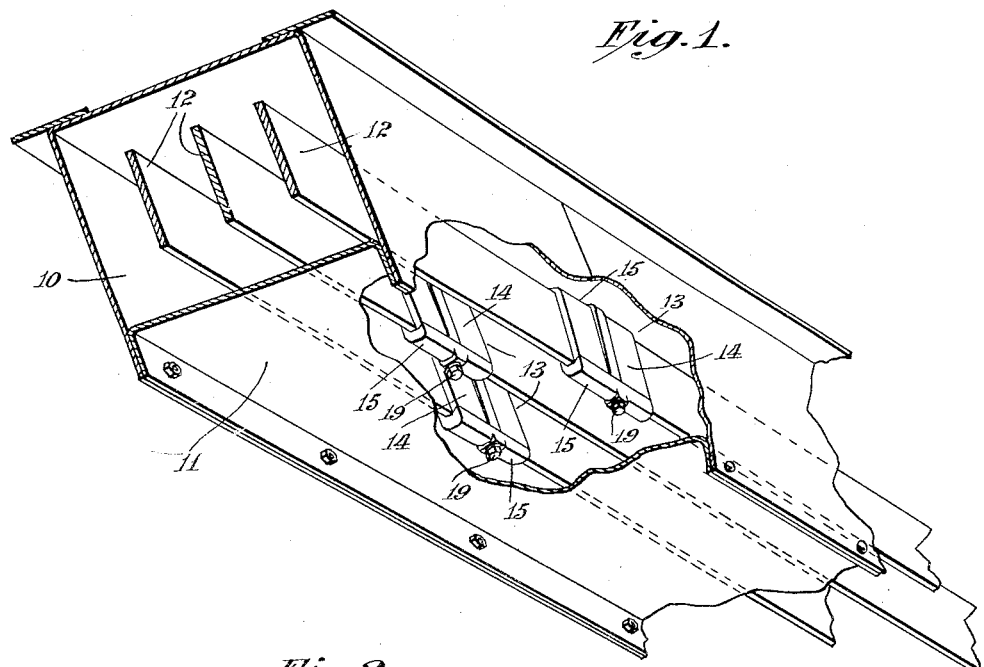
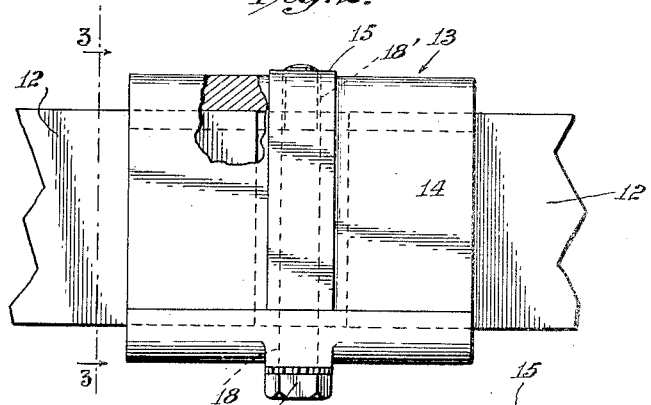
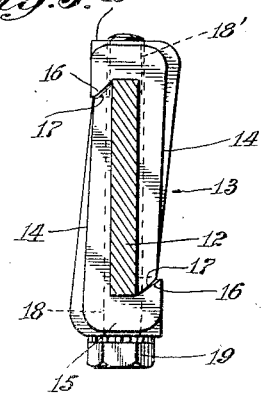
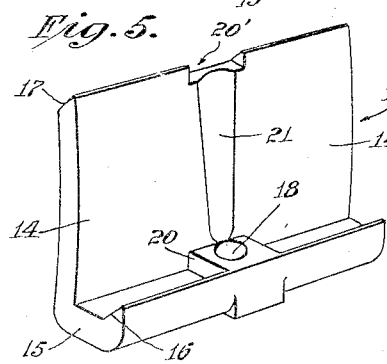
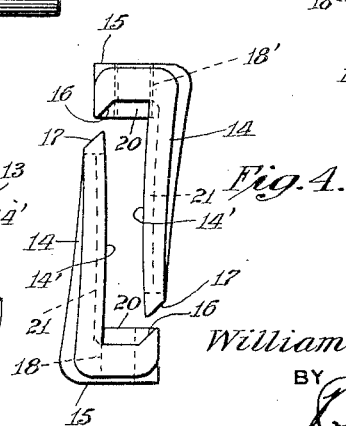
INVENTOR
William C. Anderson
BY
ATTORNEY Oct. 15, 1940.                    W. C. ANDERSON                    2,218,016
                                   BUS BAR CLAMP
                               Filed Aug. 10, 1938                 2 Sheets-Sheet 2

INVENTOR
William C. Anderson
BY
ATTORNEY

Patented Oct. 15, 1940

2,218,016

UNITED STATES PATENT OFFICE 2,218,016

BUS BAR CLAMP

William C. Anderson, Bromley, Ky., assignor to The Trumbull Electric Manufacturing Company, Plainville, Conn., a corporation of Connecticut Application August 10, 1938, Serial No. 224,032

7 Claims. (Cl. 24—243)

This invention relates particularly to clamps for mechanically and electrically connecting flat bus bar conductors.

It is an object of the present invention to eliminate the necessity for the old practice of drilling holes in the ends of bus bar conductors or overlapping the ends in order to mechanically and electrically connect them.

It is a further object to provide an effective clamp that may be readily applied to bus bar conductors which are supported in a conduit or other form of enclosure.

Another object is to provide a clamp that is simple in construction and projects so little from the bus bars that it takes up a minimum of space both vertically and horizontally.

It is another object to provide a clamp that is adapted to connect adjacent bus bar conductors of different widths.

Another object is to provide a clamp that affords a firm and positive contact across the entire width of the ends of adjacent bus bar conductors.

Another object is to provide a clamp with clamping portions that automatically position themselves.

In its preferred form the device includes two flanged metallic plates which overlap on the butt ended bars and are securely clamped in place by a single bolt or screw. These plates may be formed of suitable metal such as brass or copper or any suitable conducting metal, and may be fabricated from either strip or drawn stock or from either molded or die formed castings according to size or requirements.

Fig. 1 is a perspective view looking upwardly from the bottom of a section of a bus bar conduit with parts broken away to show the improved clamps in position connecting the bus bar conductors.

Fig. 2 is a side view of a bus bar joint on a larger scale showing an improved clamp in position.

Fig. 3 is a section and edge view, the bar being sectioned on line 3—3 of Fig. 2.

Fig. 4 is an edge view of the clamp plates with the members separated.

Fig. 5 is a perspective view of one of the clamping members.

Figure 6:
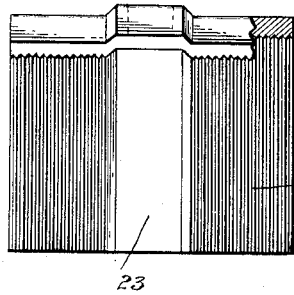
Fig. 6 is a side view of a modified form of grooved clamping member, part being broken away.

The conduit or housing body 10 is usually formed of sheet metal in channel form and provided with a removable cover portion 11.

Bus bars 12, usually flat, are arranged edgewise in the conduit and supported in such a manner as to be insulated from each other as usual.

The feeder distribution system in modern industrial plants carries the electrical energy to considerable distances necessitating the joining of bus bars of considerable lengths, and it is difficult to join them without either overlapping the ends or boring holes in the ends and using tie plates. Considerable time and labor is expended in assembling and disassembling bus bars which are connected in this manner.

In my present invention, I provide a clamping device consisting of complimentary plate sections 13, such as shown in Figs. 1 to 5, inclusive. Each section includes an elongated body portion 14 having an integral flange portion 15 at one edge of the body portion terminating at its free edge in a slanting edge 16 inclined outwardly of the body portion and downwardly of the flange. The outer edge of the body portion is formed with a bevelled or slanting edge 17 at the same inclination as the edge 16. Flange 15 is formed with a central opening 18 for receiving the shank of a fastening member, such as a bolt or screw 19 having one end threaded and having an enlargement around the opening 18 providing shoulders 20. The opening 18' of one section may be smaller than the opening in the other section and tapped to receive the threaded end of the screw 19. The inner surface of the body portion 14 may be grooved as indicated at 21 to allow clearance for the shank of the fastening member. The adjacent faces 14' are preferably curved slightly as shown in Fig. 4.

To clamp the adjacent bus bars, a clamping section 13 is positioned on each side of the bus bars, with the shoulders 20 engaging the adjacent ends of the bus bars to properly space them apart to permit the bolt 19 to pass therebetween. The edge of the plate is provided with a notch 20' to fit the projection 20 on the other plate. The bolt 19 is inserted through the opening 18 and the space between the adjacent ends of the bus bars with its threaded end inserted in the screw threaded opening 18'. When the bolt is tightened, it will draw the sections 13 toward each other vertically and laterally to clamp the bus bar ends. The curvature of the faces 14' of the body portions causes contact with the bus bars first at the center of the body portion and as the bolt is tightened the slanting edges 16 and 17 will slide upon each other forcing the ends of the sections 13 together thus straightening out the plate portions 14' and establishing a somewhat resilient but a firm high pressure contact across the entire width of the bus bars.

Figure 7:
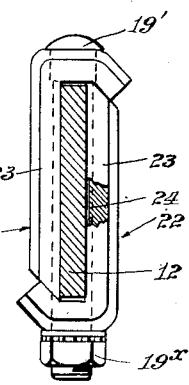
Fig. 7 is an edge view of the form of clamp of Fig. 6 in position on a sectioned bar, a part of one plate being broken away.

In the form shown in Figs. 6 and 7, each clamping section 22 has the inner surface of the ends of its body portion 23 formed with grooves and teeth 24 vertically arranged to insure good contact and gripping.

Figure 8:
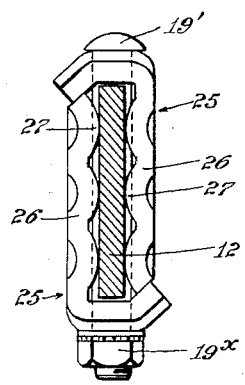
Fig. 8 is an edge view of another modified form of clamp in position on a sectioned bar.

Fig. 8 shows a modified form of clamping section 25 having its body portion 26 formed with horizontal corrugations or ripples 27.

Figure 9:
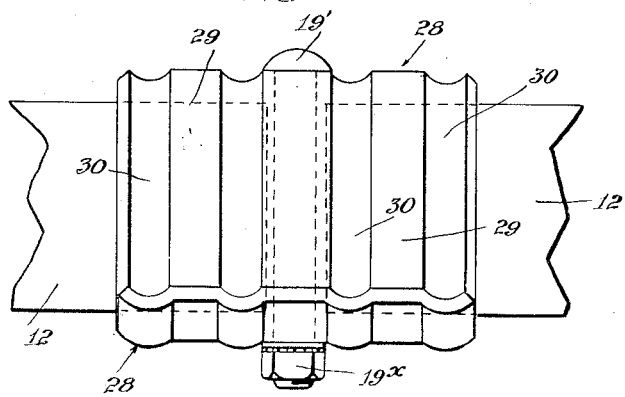
Fig. 9 is a side view of a bus bar joint with still another modified form of corrugated clamp in position.
Figure 10:
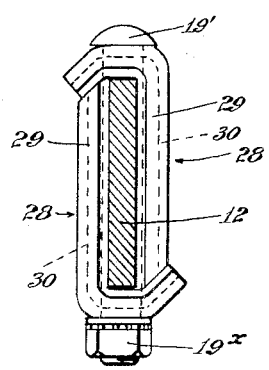
Fig. 10 is an edge view of the form of clamp of Fig. 9 on a sectioned bar.
Figure 11:
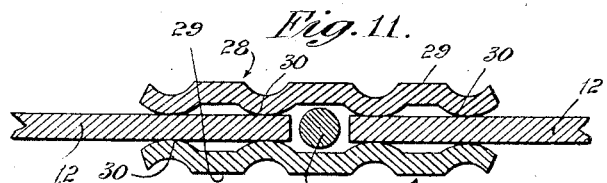
Fig. 11 is a sectional plan view through the joint shown in Fig. 9 showing the line contacts.

In Figs. 9, 10 and 11, a still further modified form of clamping section 28 is shown. This section 28 has its body portion 29 formed with vertically arranged corrugations or ripples 30.

In the forms shown in Figs. 7, 8, 9 and 10, the openings in both members of each pair of clamps for receiving the bolt 19' may be identical so as to permit the bolt to pass freely through both members, in which construction a nut 19x may be provided to clamp the parts together. This construction obviates the necessity of pairing the clamp members thus facilitating construction and reducing cost. It will also be clear that the forms shown in Figs. 2, 3 and 4 may be provided with identical bolt openings as above described.

In all of the forms shown, the body portion of the clamp may be slightly curved or bulged longitudinally to permit the clamp to contact the bus bar at its center in the first instance, and then to progressively contact the remainder of the body portion with a progressively increasing pressure, which pressure insures a positive contact and prevents the parts from becoming loose through vibration.

With my improved clamp, adjacent bus bars of different widths may be securely joined as the clamping action of the improved clamp takes place primarily along the side faces of the bus bars rather than along the narrow edges only.

Although I have shown the bus bars as flat, it should be understood that the faces of the clamping plates may be shaped to fit other shaped bus bars.

It is especially noted that this construction provides a clamping means which projects a minimum distance laterally from the bus bars so as to provide ample clearance distances between the clamps and the respective bus bars and between the clamps on the outside bus bars and the walls of the adjacent casing or conduit. Also the vertical dimensions of the clamps provide the maximum clearance from the top and bottom portions of the conduit. Further, the bus bars may be connected in a position most accessible to the workman and in a manner most obvious, simple and convenient to the workman.

A distinct advantage of this construction is that bus bars may be connected end to end so as to form a continuous straight line throughout the system without any overlapping or bending of the bars at their connected ends.

Although the clamp was originally intended for use in duct or conduit systems of distribution, it should be understood that it is applicable to all types of bus bar installations where it can be used.

Figure 12:
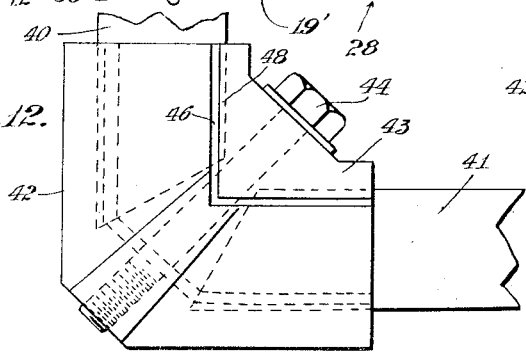
Fig. 12 is a side view of still another modified form of clamp, for connecting two bus bars which are arranged at right angles to each other.
Figure 13:
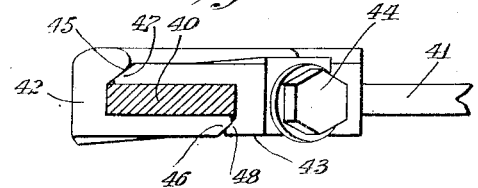
Fig. 13 is an edge view of the same.

The form shown in Figs. 12 and 13 is constructed to connect two bus bars 40, 41 which extend at right angles to each other. This form consists of an outer member 42 and an inner member 43 which are drawn together and clamped on the ends of the bus bars by means of a bolt or screw 44 which passes freely through member 43 and screws into a seat in member 42. The outer member 42 has inclined or bevelled flanges 45 and 46 which receive the thrusts of the bevelled flanges 47 and 48, respectively, of the inner member 43, when the screw 44 is tightened. In this way the bus bars are effectively connected mechanically as well as electrically.

I claim:

1. A connector for the ends of two spaced apart flat bus bars and consisting of two clamping parts, and a fastening member, each clamping part including an elongated slightly curved body portion, a flange on one edge of each body portion, each flange terminating in an inclined edge, the opposite edge of each body portion being formed with an inclined edge, said flange being formed with a central opening for receiving the fastening member between the ends of the respective bus bars, each of said flanges overlying the inclined edge of the body portion of the opposite part, whereby tightening of said fastening member will urge said body portions towards one another in a parallel manner by the mutually wedging action of the inclined edges of the flanges and of the body portions, respectively.

2. A connector for the ends of two spaced apart bus bars and consisting of two clamping parts and a fastening member, each clamping part including an elongated slightly convex body portion, a flange on one edge of each body portion, said flange terminating in an inclined edge, the opposite edge of said body portion being formed with an inclined edge, said flange being formed with a central opening for receiving the fastening member between the respective ends of the bus bars and said body portion being formed with corrugations on its inner surface, each of said flanges overlying the inclined edge of the body portion of the opposite part, whereby tightening of said fastening member will urge said body portions towards one another in a parallel manner by the mutually wedging action of the inclined edges of the flanges and of the body portions, respectively.

3. A connector for connecting the ends of two flat spaced apart bus bars in a straight line relation and having two spaced complementary sections with oppositely faced body portions, oppositely faced flange portions forming grooves for the edges of bus bars, inclined abutting edges and aligned openings in the flange portions, shoulders on the flange portions on opposite sides of the openings for positioning the ends of bus bars, one of said inclined abutting edges being formed with a notch to receive the shoulders of the other section and a clamping bolt passing through the openings in the flange portions and between the ends of the respective bus bars.

4. A bus bar connector including two members having side plates for clamping against the opposite sides of the adjacent ends of two flat bus bars, each member having a flange for extending over edges of the ends of the adjacent bus bars and a clamp screw extending through said members and between the ends of the bus bars to clamp the members against the bus bars and against each other and connect the bus bars.

5. A connector for the ends of two flat bus bars and consisting of two clamping parts with coacting overlapping cam-like edges and a fastening member, one part including a plate member with its ends extending at right angles to each other and with an opening formed approximately midway of its ends, the other part including a plate member having its ends extending at right angles to each other and being provided with an opening substantially midway of its ends and adapted to align with the first named opening for receiving the fastening member, said fastening member serving to draw the clamping parts toward each other and toward the edges of the bus bars and cause the cam-like edges on the respective parts to coact with one another and force the plate members against the bus bars.

6. In a clamp for connecting the adjacent ends of two flat bus bars each of substantially rectangular cross section, two clamp members, each member having a substantially flat side plate extending endwise away from the center of the clamp member for engaging one side of one end of a flat bus bar and a groove at one edge bounded by an inclined wedge-like flange, the edge of each side plate opposite to its wedge-like flange having an inclined wedge portion coacting with the wedge-like flange of the other member and a clamp bolt connecting the central parts of the flanges of the two members between the adjacent ends of the bus bars held between the clamp members for drawing the clamp members toward the opposite edges of the bus bars and at the same time causing the coaction of the respectively inclined wedge portions to force the side plates to engage the opposite sides of the respective bus bar ends.

7. A connector for the ends of two rectangularly sectioned bus bars including two similarly formed and mutually coacting parts, each part including a major flat portion having one edge unturned and cut at an acute angle and having its opposite edge bent around for slightly less than 180°, and also including means for assembling said two parts with their flat portions directly opposite and substantially parallel to one another and with the bent edge of each part overlapping the unturned edge of the other part, said assembly means including means for urging the bent edges of the two portions towards one another, whereby said bent edges mutually coact with the angular portions of said unturned edges and mutually urge said flat portions toward one another while maintaining them in a substantially parallel relation so as to grip the ends of the bus bars.

WILLIAM C. ANDERSON.